2 Sheets—Sheet 1.
C. G. EVERET.
Corn Planter.
No. 229,985.  Patented July 13, 1880.
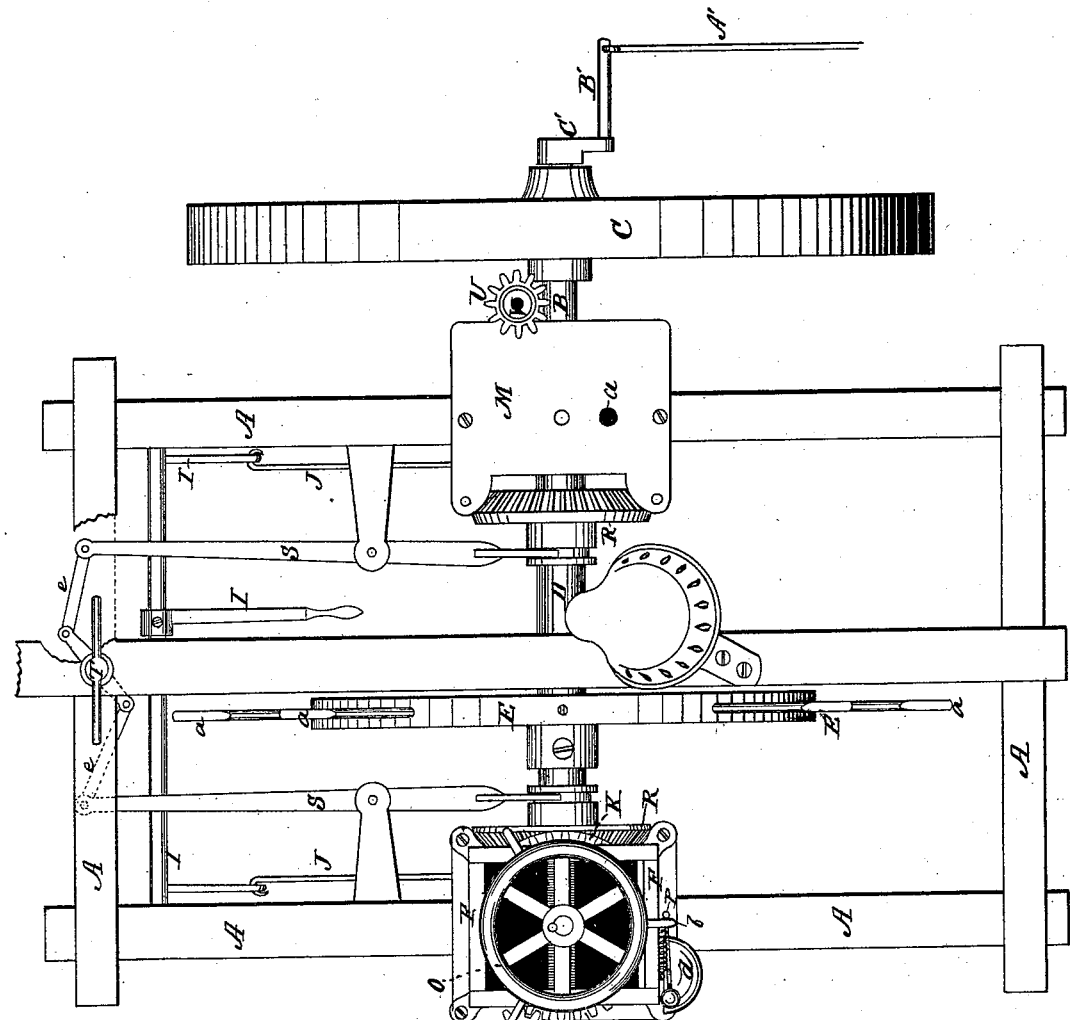
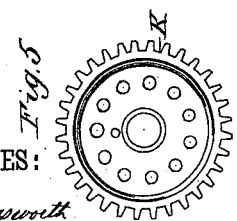
WITNESSES:
W. W. Hollingsworth
Amos W. Hart
INVENTOR:
C. G. Everet
BY
ATTORNEYS.

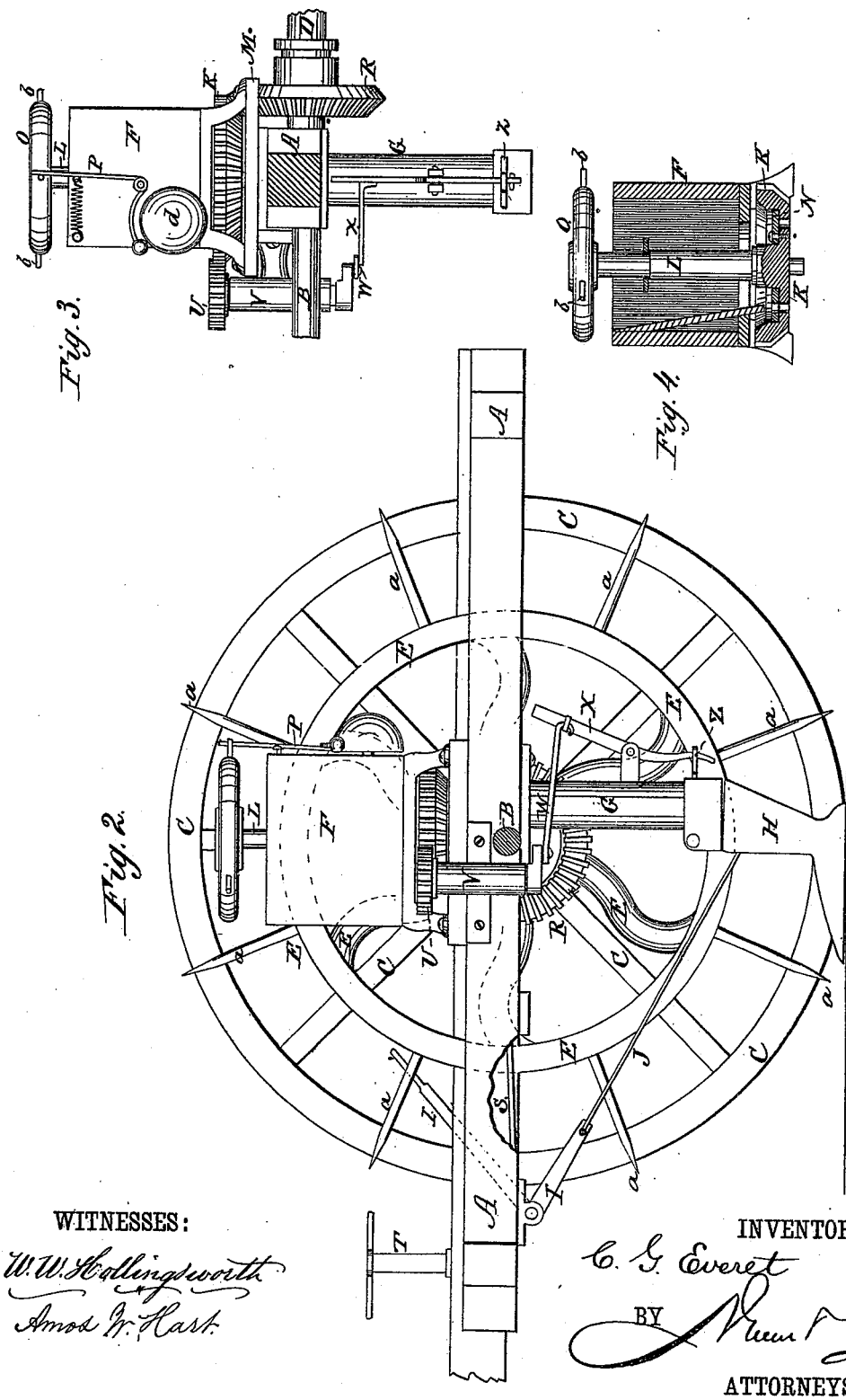

UNITED STATES PATENT OFFICE.

CHARLES G. EVERET, OF BELLEFONTAINE, OHIO.

CORN-PLANTER.

SPECIFICATION forming part of Letters Patent No. 229,985, dated July 13, 1880.

Application filed November 26, 1879.

*To all whom it may concern:*

Be it known that I, CHARLES G. EVERET, of Bellefontaine, in the county of Logan and State of Ohio, have invented a new and useful Improvement in Corn-Planters; and I do hereby declare that the following is a full, clear, and exact description of the same.

My invention relates to improvements in check-row corn-planters and drill combined, and is in part an improvement upon the planter for which I have obtained Letters Patent No. 216,386, dated June 10, 1879.

My improvements pertain to the construction and arrangement of devices forming the seed-discharging mechanism proper and the devices for imparting regular or uniform motion to such mechanism; also to the devices for indicating the intermittent operation of the seed-dropping slides.

In the accompanying drawings, forming part of this specification, Figure 1 is a plan view of the machine with a portion of the frame broken out and one of the seed-hoppers detached. Fig. 2 is a vertical section on line $x$ $x$, Fig. 1. Fig. 3 is a detail section, showing one of the hoppers and its attachments. Fig. 4 is a vertical section of a hopper. Fig. 5 is a plan of the seed-disk and its apertured plate detached or separated.

The rectangular frame A is mounted on an axle, B, having two loose-running wheels, C C. Said axle B passes through a sleeve or short hollow axle, D, on which is keyed a skeleton-wheel, E, having long radial spikes or teeth $a$, that enter the soil as the machine advances, so that said wheel is thereby made to rotate. The latter thus constitutes the means for imparting positive and uniform motion to the seed-discharging mechanism, whose construction, arrangement, and operation are as follows: The seed is placed in hoppers F, from which it passes into spouts G, provided with hinged furrow-openers H, that are also adapted for covering the seed, and have a lever-and-rod attachment, I J, for lifting them out of the ground, as in my former invention.

The bottom of the hoppers F is formed by circular wheels or disks K, which are toothed exteriorly and keyed on vertical shafts L, that are stepped in a horizontal plate, M, secured to the frame A. The disks K are cup-shaped or provided with a concavity, and the inner side of the rim is also grooved, and an annular plate, N, is fitted therein and secured by a screw, Fig. 4. The said plate N is provided with three holes, which register with similar holes in the concave disks K, and through these holes the seed drops successively as the disks rotate and bring the holes successively into coincidence with the hole $a$ in fixed plate M.

The disks or wheels K will in practice each have eleven holes, and when the plate N is removed the seed will discharge through each of the eleven holes at each rotation of the disk or wheel, so that the corn will be planted in drills, (twelve inches apart;) but when the plate N is in position, as shown in Fig. 4, it covers all of the eleven holes save the three which register with its own, and hence the seed can discharge but three times in each rotation of the disk, instead of eleven times, so that the corn will be planted in check-rows, (three feet eight inches apart if the transporting-wheels be three feet eight inches in diameter.) Thus, by removing the plate N or attaching it, the machine is converted into a drill or check-row planter, as required.

On the upper end of each of the seed-disk shafts L is keyed a wheel, O, having radial tappets $b$, which as said wheels rotate come successively in contact with a bell-crank spring-hammer, P, and cause the same to strike a bell, $d$, attached to the side of the hopper F. The bells are each struck three times in each rotation of the tappet-wheels O, and the regular intermittent sound serves to inform the driver that the seed-dropping mechanism is operating with the desired regularity and uniformity.

It will be understood that the bells sound at the moment the corn drops from the lower seed-valve into the ground.

The operation of the seed-dropping mechanism above described is effected by the miter-gears R, which rotate with the spiked wheel E and its axle D, but slide on the latter, so that they may be put into or removed from engagement with the disks K when desired. The chief means for sliding said gears R on the axle consist of levers S, which are pivoted centrally and arranged horizontally and lengthwise of the frame A. The front ends of these levers are connected by links e with the crosshead of a vertical shaft, T, located at the front end of frame A, and having arms by which it may be turned to vibrate the levers S and throw the seed-dropping mechanism into or out of gear as required. The said mechanism being thrown out of gear, the driver can rotate the wheels, and thus make a drop by hand at any time required. This is especially necessary when starting at the end of a row after having turned the machine about.

The seed-disks K have both miter and spur teeth. The spur-teeth mesh with the pinions U on short vertical shafts V, whose crank-rods W are connected with the rigid lateral arms of levers X, whose vibrations reciprocate the seed-slides Z, placed in the lower ends of spouts G. The arrangement is such that the slides Z reciprocate three times for each rotation of the concave seed-wheels in correspondence with the number of seed-holes of the disks and the number of droppings when check-rowing.

In order that the machine may be set and started straight at each end of the field, and thus drop the seed in line with the row previously dropped, I hinge a rod, A', to a bar, B', which projects laterally from a short crank-arm, C', affixed to the end of the solid axle B. The said rod is therefore loosely pendent from the crank-arm, and the latter inclines rearward and downward, so that the lateral bars project in line with the seed-spouts.

When the machine is turned about at the end of the field, the rod A' hangs vertically over the last drop in previous row, and the machine is in line with such previous row, the first drop on the new row must necessarily be in true check crosswise, which drop is made by hand. The machine is then geared up, (by rotating the shaft T so as to cause the levers S to throw the miter-gears R into engagement with the toothed seed-disks K,) and the dropping will be made automatically as the machine advances.

I do not claim, broadly, the use of a spiked wheel in connection with seed discharging or dropping devices.

What I claim is—

1. In a check-row planter and drill, a wheel having spikes for entering the soil and rotating vertically and free on the axle of the transporting-wheels, in combination with gears and toothed seed-distributing disks forming the bottom of seed-hoppers, substantially as shown and described, whereby the ground passed over is accurately measured and the seed is dropped at uniform distances, as specified.

2. In a check-row planter and drill, the combination of the spiked wheel and its hollow axle running on the axle of transporting-wheels, the bevel-gears having a feather-connection with the hollow axle, the perforated seed-disks toothed exteriorly, the hoppers, and the vertical shafts having tappet-wheels affixed to their upper ends and the bell-alarm affixed to the side of the hopper to admit of operation by the tappet-wheel, all as shown and described.

3. The combination, with the toothed or geared rotating seed-disks, of the vertical crank-shafts V V and rods W, for operating the seed-slides, arranged on the outer sides of said disks, and the spiked wheel and gears R, arranged between the latter, as and for the purpose specified.

4. In a check-row planter and drill, the combination, with the apertured seed disks or wheels having a concavity in the upper side, of the detachable apertured annular plates N, as shown and described.

CHARLES GODFREID EVERET.

Witnesses:
   JOS. H. LAWRENCE,
   SCOTT PLUM.